(12) United States Patent
Shaik (10) Patent No.: US 9,052,200 B1
(45) Date of Patent: Jun. 9, 2015

(54) AUTOMATIC TRAVEL DIRECTIONS (71) Applicant: Google Inc., Mountain View, CA (US)

(72) Inventor: Moulaali Shaik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/291,117

(22) Filed: May 30, 2014

(51) Int. Cl.
*G06F 19/00* (2011.01)
*G01C 21/00* (2006.01)
*G01C 21/26* (2006.01)

(52) U.S. Cl.
CPC ............... *G01C 21/00* (2013.01); *G01C 21/26* (2013.01)

(58) Field of Classification Search
CPC ........... G01C 21/3679; G01C 21/3476; G01C 21/3676; G01C 21/26; G06F 17/3087
USPC ............. 701/408, 425, 431, 533; 340/995.14, 340/995.24
See application file for complete search history.

(56) References Cited

U.S. PATENT DOCUMENTS

| 6,282,489 | B1 * | 8/2001 | Bellesfield et al. | 701/533 |
|---|---|---|---|---|
| 6,498,982 | B2 * | 12/2002 | Bellesfield et al. | 701/533 |
| 6,993,430 | B1 * | 1/2006 | Bellesfield et al. | 701/533 |
| 7,831,385 | B2 * | 11/2010 | Sato | 701/424 |
| 7,912,628 | B2 * | 3/2011 | Chapman et al. | 701/117 |
| 7,953,548 | B2 * | 5/2011 | Vengroff et al. | 701/425 |
| 8,170,791 | B1 * | 5/2012 | Bellesfield et al. | 701/409 |
| 8,229,669 | B2 | 7/2012 | Roumeliotis et al. | |
| 8,335,643 | B2 | 12/2012 | Vandivier et al. | |
| 8,615,359 | B2 | 12/2013 | Alam et al. | |
| 8,706,407 | B2 * | 4/2014 | Tuukkanen | 701/423 |
| 2002/0038180 | A1 * | 3/2002 | Bellesfield et al. | 701/202 |
| 2006/0271286 | A1 * | 11/2006 | Rosenberg | 701/211 |
| 2007/0067102 | A1 * | 3/2007 | Sato | 701/209 |
| 2009/0005968 | A1 * | 1/2009 | Vengroff et al. | 701/202 |
| 2010/0161720 | A1 * | 6/2010 | Colligan et al. | 709/203 |
| 2012/0303270 | A1 | 11/2012 | Su et al. | |
| 2012/0316770 | A1 | 12/2012 | Damon et al. | |
| 2013/0035853 | A1 * | 2/2013 | Stout et al. | 701/438 |
| 2013/0158846 | A1 * | 6/2013 | Zhang | 701/117 |
| 2013/0173157 | A1 * | 7/2013 | Bellesfield et al. | 701/533 |

* cited by examiner

*Primary Examiner* — McDieunel Marc
(74) *Attorney, Agent, or Firm* — Dority & Manning, P.A.

(57) ABSTRACT

In one aspect, a computer-implemented method for automatically providing travel directions to users of a geographic information system client may generally include receiving, by one or more computing devices, a search request from a user associated with a geographic location, identifying at least one reference travel route between a current location of the user and the geographic location, monitoring an actual travel route taken by the user without actively providing travel directions to the user as the user travels along the actual travel route, comparing the actual travel route to the at least one reference travel route using a background software routine implemented by the one or more computing devices and automatically initiating, when the actual travel route differs from the at least one reference travel route, a navigation software routine for actively providing the user travel directions to the geographic location.

20 Claims, 3 Drawing Sheets

AUTOMATIC TRAVEL DIRECTIONS

FIELD

The present subject matter relates generally to geographic information system (GIS) clients and related systems.

BACKGROUND

Geographic Information Systems (GIS) clients capture, store, manage and display data elements according to geospatial coordinates. For example, mapping clients, such as Google Maps, render maps, satellite imagery and other data over a two-dimensional surface. Similarly, earth-browsing clients, such as Google Earth, render satellite imagery, terrain, vectors and other data over a three-dimensional geometry representing the Earth's surface. Thus, a user of Google Maps or Google Earth may navigate across the two-dimensional surface or three-dimensional geometry while data and images corresponding to geographical locations are presented to the user.

When using a GIS client, a user may input a search request associated with finding a given travel destination on the associated geospatial asset, such as a 2-D map or a 3-D globe. In response to the search request, the GIS client displays the location of the travel destination on the geospatial asset.

SUMMARY

In one aspect, the present subject matter is directed to a computer-implemented method for automatically providing travel directions to users of a geographic information system client. The method may generally include receiving, by one or more computing devices, a search request from a user associated with a geographic location, identifying at least one reference travel route between a current location of the user and the geographic location, monitoring an actual travel route taken by the user without actively providing travel directions to the user as the user travels along the actual travel route, comparing the actual travel route to the at least one reference travel route using a background software routine implemented by the one or more computing devices and automatically initiating, when the actual travel route differs from the at least one reference travel route, a navigation software routine for actively providing the user travel directions to the geographic location.

In another aspect, the present subject matter is directed to a system for automatically providing travel directions to users of a geographic information system client. The system may generally include one or more computing devices having one or more processors and associated memory. The memory may store instructions that, when executed by the processor(s), configure the computing device(s) to receive a search request associated with a geographic location from a user and, in response to the search request, implement a background software routine. The background software routine may be configured to monitor movements of the user without actively providing travel directions to the user and determine whether the user's movements are indicative of the user being lost based on at least one movement-related factor as the user travels to the geographic location. Additionally, when the background software routine determines that the user's movements are indicative of the user being lost, the computing device(s) may be further configured to automatically initiate a navigation software routine for actively providing the user travel directions to the geographic location.

In a further aspect, the present subject matter is directed to a tangible, non-transitory computer-readable medium storing computer-executable instructions that, when executed by one or more processors, cause the processor(s) to perform specific operations. The operations may generally include receiving a search request associated with a geographic location from a user, identifying at least one reference travel route between a current location of the user and the geographic location, monitoring an actual travel route taken by the user without actively providing travel directions to the user as the user travels along the actual travel route, comparing the actual travel route to the at least one reference travel route using a background software routine implemented by the one or more processors and automatically initiating, when the actual travel route differs from the at least one reference travel route, a navigation software routine for actively providing the user travel directions to the geographic location.

Other exemplary aspects of the present disclosure are directed to other methods, systems, apparatus, non-transitory computer-readable media, user interfaces and devices for automatically providing travel directions to a user of a geographic information system client.

These and other features, aspects and advantages of the various embodiments will become better understood with reference to the following description and appended claims. The accompanying drawings, which are incorporated in and constitute a part of this specification, illustrate embodiments of the invention and, together with the description, serve to explain the related principles.

BRIEF DESCRIPTION OF THE DRAWINGS

Detailed discussion of embodiments directed to one of ordinary skill in the art, are set forth in the specification, which makes reference to the appended figures, in which.

DETAILED DESCRIPTION

The present subject matter is directed to systems and computer-implemented methods for automatically providing travel directions to users of a geographic information system (GIS) client. In many instances, a user may conduct a search within a GIS client for a particular geographic location without actually requesting travel directions to such location. In these instances, the user's device may be configured to implement a background software routine that allows for turn-by-turn directions to be automatically provided to the user in the event that the user becomes lost when traveling to the searched location. For example, the background software routine may be configured to monitor the user's movement and determine whether such movement is indicative of the user being lost. If so, a navigation software routine may be automatically initiated that allows turn-by-turn directions to be actively provided to the user for navigating to the selection location.

In several embodiments, the background software routine may be configured to determine whether the user is lost based on one or more movement-related factors. For instance, in one embodiment, when the search is initially conducted by the user, one or more proposed or reference travel routes may be stored or cached within the user's device that provide travel directions to the searched location. The actual travel path taken by the user may then be monitored and compared to the reference travel route(s) via the background software routine. If the actual travel path differs from the reference travel route(s) by a given degree, the navigation software routine may be automatically initiated in order to provide travel directions to the user.

In addition, or an as alternative thereto, any other suitable movement-related factors may be used as a trigger(s) for activating or initiating the navigation software routine. For example, as the user nears the searched geographic location, his/her movement may be monitored to identify certain lost travel patterns (e.g., going around in circles), which may provide an indication that the user is lost. As another example, the travel speed of the user may be used as indication that he/she is lost (e.g., when there is a substantial reduction in travel speed).

The technology described herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer processes discussed herein may be implemented using a single computing device or multiple computing devices working in combination. Databases and applications may be implemented on a single system or distributed across multiple systems. Distributed components may operate sequentially or in parallel.

Figure 1:
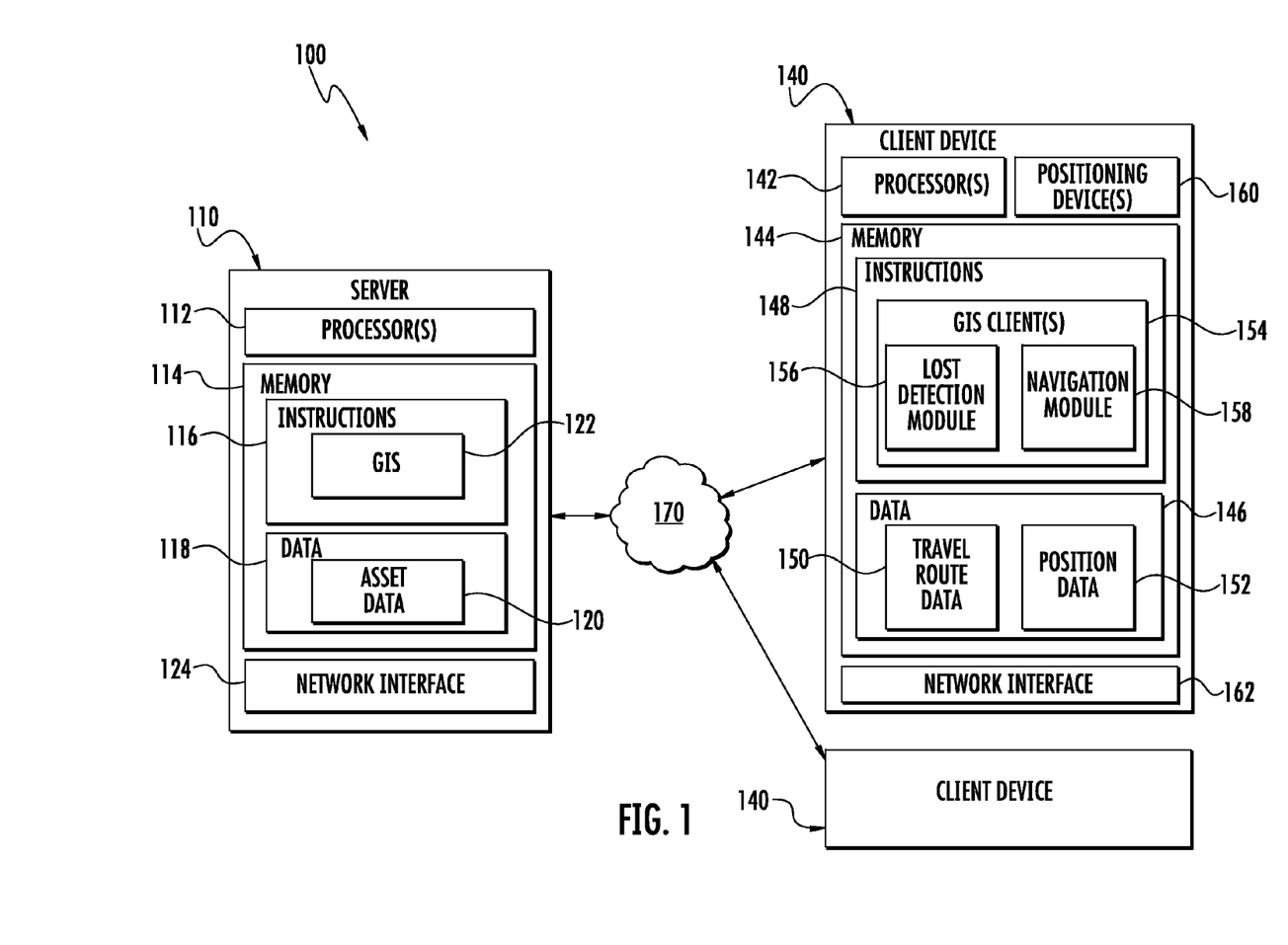
FIG. 1 illustrates a schematic diagram of one embodiment of a system for automatically providing travel directions to a user of a GIS client in accordance with aspects of the present subject matter.

Example Systems for Automatically Providing Travel Directions To Users of a GIS Client Referring now to FIG. 1, one embodiment of a system 100 for automatically providing travel directions to users of a GIS client is illustrated in accordance with aspects of the present subject matter. As shown in FIG. 1, the system 100 may include a client-server architecture where a server 110 communicates with one or more clients, such as a local client device 140, over a network 170. The server 110 may generally be any suitable computing device, such as a remote web server(s) or a local server(s), and/or any suitable combination of computing devices. For instance, the server 110 may be implemented as a parallel or distributed system in which two or more computing devices act together as single server. Similarly, the client device 140 may generally be any suitable computing device(s), such as any suitable display with one or more processors coupled thereto and/or embedded therein. In a particular embodiment, the client device 140 may correspond to a mobile device, such as a smartphone(s), tablet(s), wearable computing device(s), laptop(s) and/or any other suitable mobile device(s). Although only two client devices 140 are shown in FIG. 1, it should be appreciated that any number of clients may be connected to the server 110 over the network 170.

In several embodiments, the server 110 may host a GIS 122, such as a mapping application (e.g. the Google Maps mapping services provided by Google Inc.), a virtual globe application (e.g. the Google Earth virtual globe application provided by Google Inc.), or any other suitable geographic information system. On the client-side, the client device 140 may present a user interface that allows a user to interact with the GIS 122. For instance, the user interface may be served through a network or web-based application that is executed on the client device 140, such as a web browser, a thin client application or any other suitable network or web-based application or the user interface may be served locally on the client device 140. The server 110 may transmit geospatial data, such as satellite and/or aerial imagery and other geospatial data (e.g., terrain and vector data), associated with rendering one or more geospatial assets (e.g., a 2-D map or 3-D globe) over the network 170 to the client device 140. Upon receipt of this data, the client device 140 may render the geospatial data, via the user interface, in the form a map or globe view that is displayed on a display device associated with the client device 140. A user may then access and/or interact with the map or globe view presented in the user interface. For example, as will be described below, a user of the client device 140 may input a search request for locating a specific geographic location within the displayed map or globe.

As shown in FIG. 1, the server 110 may include a processor(s) 112 and a memory 114. The processor(s) 112 may be any suitable processing device, such as a microprocessor, microcontroller, integrated circuit, or other suitable processing device. Similarly, the memory 114 may include any suitable computer-readable medium or media, including, but not limited to, non-transitory computer-readable media, RAM, ROM, hard drives, flash drives, or other memory devices. The memory 114 may store information accessible by processor(s) 112, including instructions 116 that can be executed by processor(s) 112 and data 118 that can be retrieved, manipulated, created, or stored by processor(s) 112. In several embodiments, the data 118 may be stored in one or more databases.

For instance, as shown in FIG. 1, the memory 114 may include an asset database 120 storing asset data associated with one or more geospatial assets capable of being served to the client device 140 by the server 110 (e.g., via the GIS 122). For instance, the asset data may correspond to any suitable data or information associated with rendering a given geospatial asset(s) (e.g., a 3-D globe(s) or a 2-D map(s)), such as imagery data (e.g., aerial and/or satellite images), vector data, terrain data, layer data, search data and/or the like.

Additionally, as indicated above, the server 110 may, in several embodiments, be configured to host a GIS 122 that allows the server 110 to communicate with a corresponding GIS client(s) 154 running on the client device 140. Thus, in response to access requests transmitted by the client device 140, geospatial data associated with one or more geospatial assets, including satellite and/or aerial imagery, may be transmitted to and rendered by the client device 140 to allow a user to navigate and/or interact with the geospatial asset(s).

As shown in FIG. 1, the server 110 may also include a network interface 124 for providing communications over the network 170. In general, the network interface 124 may be any device/medium that allows the server 110 to interface with the network 170.

Similar to the server 110, the client device 140 may also include one or more processors 142 and associated memory 144. The processor(s) 142 may be any suitable processing device, such as a microprocessor, microcontroller, integrated circuit, or other suitable processing device. Similarly, the memory 144 may be any suitable computer-readable medium or media, including, but not limited to, non-transitory computer-readable media, RAM, ROM, hard drives, flash drives, or other memory devices. As is generally understood, the memory 144 may be configured to store various types of information, such as data 146 that may be accessed by the processor(s) 142 and instructions 148 that may be executed by the processor(s) 142. The data 146 may generally correspond to any suitable files or other data that may be retrieved, manipulated, created, or stored by processor(s) 142. In several embodiments, the data 146 may be stored in one or more databases.

As shown in FIG. 1, in several embodiments, the memory 144 may include a travel route database 150 for storing one or more proposed or reference travel routes associated with travel directions from a user's current location to a particular searched geographic location. For instance, when a user inputs a search request for locating a particular geographic location within a given geospatial asset, a reference travel route(s) may be stored or cached within the memory 144 of the client device 140. As will be described below, such reference travel route(s) may be used to provide an indication that the user has lost his/her way when traveling to the searched geographic location. Moreover, as shown in FIG. 1, the memory 144 may include a position database 152 for storing position data associated with the current location and/or movement of the client device 140.

Additionally, the instructions 148 stored within the memory 144 of the client device 140 may generally be any set of instructions that, when executed by the processor(s) 142, cause the processor(s) 142 to provide desired functionality. For example, the instructions 148 may be software instructions rendered in a computer readable form or the instructions may be implemented using hard-wired logic or other circuitry. In several embodiments, suitable instructions may be stored within the memory 144 for implementing one or more GIS clients 154, such as one or more earth-browsing clients and/or mapping clients, designed to render the geospatial data (including satellite and/or aerial imagery) associated with the geospatial assets available via the GIS 122. For instance, the GIS client(s) 154 may be configured to retrieve geospatial data from the server 110 and render such data in the form of a map or globe view for display/use by the user.

As shown in FIG. 1, in several embodiments, the instructions 148 stored within the memory 144 may be executed by the processor(s) 142 to implement a lost detection module 156 and a navigation module 158 associated with the GIS client(s) 154. In general, the lost detection module 156 may be configured to execute a background software routine on the client device 140 to assist in determining when a user may have lost his/her way when traveling to a searched location. As used herein, the term "background software routine" refers to a software routine or process that is implemented without user intervention and/or that does not have its own user interface. As such, the background software routine is implemented without actively providing the user updates and/or notifications related to the process being executed. For instance, with reference to the lost detection module 156, the background software routine associated therewith may be implemented without providing the user any updates and/or notifications regarding his/her current location relative to one or more of the reference travel routes.

In several embodiments, the background software routine associated with the lost detection module 156 may be triggered or activated upon receiving a search request input into the GIS client 154 by a user. For instance, the user may input an address into the GIS client 154 for determining its location on the associated map or globe. Alternatively, the user may input a search request associated with locating a particular entity, such as a building, park, landmark, restaurant, store, etc. As is generally understood, upon receipt of the search request, the GIS client 154 may be configured to determine the geographic location associated with the user's request and display such location on the map or globe presented to the user.

As indicated above, the disclosed system and method are based on the assumption that the user does not actively request travel directions to the geographic location associated with the user's search request. Thus, in several embodiments, upon determining the geographic location associated with the user's search request, the background software routine may be configured to identify one or more reference travel routes for traveling (e.g., driving) from the user's current location to the searched geographic location. For instance, in one embodiment, the background software routine may be configured to transmit a route request to the server requesting that one or more reference travel routes be transmitted back to the client device 140. Alternatively, the background software routine may be configured to determine the reference travel route(s) based on data currently available and/or accessible to the client device 140. Regardless, once identified, the reference travel route(s) may be stored within the memory 144 of the client device 140, such as by temporarily caching the travel route(s) within the device's memory 144.

In addition to identifying the reference travel route(s), the background software routine implemented by the lost detection module 156 may also be configured to monitor an actual travel route taken by the user in relation to the reference travel route(s). Specifically, in several embodiments, the background software routine may be configured to monitor or track the user's movement and compare such movement to the reference travel route(s). By comparing the actual travel route taken by the user to the reference travel route(s), it may be determined when the user has lost his/her way when traveling to the searched geographic location. For example, as will be described below, the lost detection module 156 may determine that the user has lost his/her way when the actual route taken by the user differs from the reference travel route(s) by a given number of off-route turns.

As indicated above, the lost detection module 156 is not configured to provide the user any notifications and/or updates relating his/her current location to reference travel route(s). Rather, such location tracking and mapping in relation to the reference travel route(s) is performed completely as background process.

In addition to comparing the actual travel route taken by the user to one or more reference travel routes (or as an alternative thereto), the lost detection module 156 may be configured to utilize any other suitable movement-related factors in order to determine when the user has lost his/her way when traveling to the searched location. For instance, as will be described below, the background software routine may be configured to detect lost travel patterns in the user's movement as he/she travels, particularly when the user is located in close proximity to the searched geographic location. In addition, the background software routine may be configured to identify variations in the user's speed that may provide an indication that the user is lost, such as a significant reduction in the user's travel speed.

Upon determining that the user has lost his/her way when traveling to the searched geographic location, the lost detection module 156 may be configured to automatically initiate or trigger execution of a navigation software routine associated with the navigation module 158. Specifically, the navigation software routine may be configured to actively provide the user travel directions from his/her current location to the searched geographic location (e.g., via displaying the directions on an associated display of the client device 140 and/or by providing voice-guided navigation). In one embodiment, when the navigation software routine is automatically initiated, the user may be prompted to provide an input indicating that travel directions to the searched geographic location are desired. For instance, a message window may be displayed on his/her client device 140 and/or a voice command may be generated asking the user whether he/she would like to receive turn-by-turn directions to the searched geographic location. The user may then provide a suitable input to indicate his/her desire for receiving the travel directions, such as by providing a manual input on the client device 140 (e.g., by tapping a touchscreen associated with the device 140 or by pressing a button on the device 140) and/or by providing a voice input (e.g., "yes" or "no"). Alternatively, upon the automatic initiation of the navigation software routine, the routine may immediately begin to actively provide the user travel directions from his/her current location to the searched geographic location without prompting the user to provide any input.

The above-described modules 156, 158 may, in several embodiments, be provided as selectable feature(s) on the client device 140 that can be enabled and disabled by the user at any time. For instance, in one embodiment, the lost detection module 156, as well as the associated navigation module 158, may be disabled as the default. In such an embodiment, such modules 156, 158 will only be enabled when selected by the user.

As used herein, the term "module" refers to computer logic utilized to provide desired functionality. Thus, a module may be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, ROM, hard disk or optical or magnetic media.

Additionally, as shown in FIG. 1, the client device 140 may also include a positioning device 160 for generating position data associated with the client device 140. The position data may include, for example, information related to the geographic location of the client device 140 at any given time (e.g., time-stamped geographic coordinates). The position data may also include information associated with the change in location of the client device 140 over time (i.e., the speed of the device). For instance, the positioning device 160 may generate data associated with the current location of the client device 140 at a given frequency (e.g., every second, every 5 seconds, every 30 seconds, etc.). The change in location of the device 140 over time may then be analyzed to determine its speed.

The positioning device 160 may generally correspond to any suitable device or circuitry for monitoring the position (and/or change in position) of the client device 140. For example, the positioning device 160 may determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining the position of the client device 140.

Moreover, as shown in FIG. 1, the client device 140 may also include a network interface 162 for providing communications over the network 170. Similar to the interface 124 for the server 110, the network interface 162 may generally be any device/medium that allows the client device 140 to interface with the network 170.

The network 170 may be any type of communications network, such as a local area network (e.g. intranet), wide area network (e.g. Internet), or some combination thereof. The network can also include a direct connection between the client device 140 and the server 110. In general, communication between the server 110 and the client device 140 may be carried via a network interface using any type of wired and/or wireless connection, using a variety of communication protocols (e.g. TCP/IP, HTrP, SMTP, FTP), encodings or formats (e.g. HTML, XML), and/or protection schemes (e.g. VPN, secure HTTP, SSL).

Figure 2:
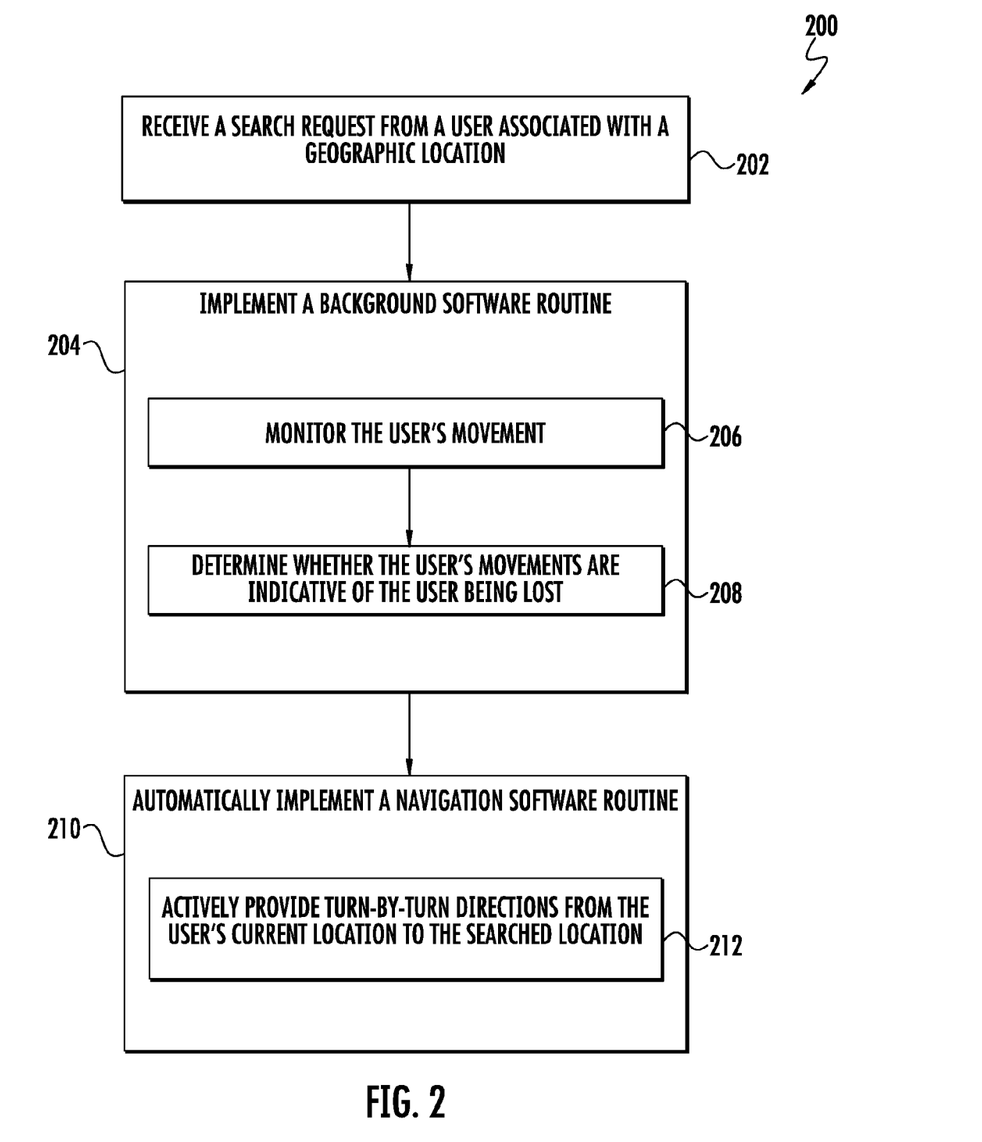
FIG. 2 illustrates a flow diagram of a method for automatically providing travel directions to a user of a GIS client in accordance with aspects of the present subject matter.

Example Methods for Automatically Providing Travel Directions to Users of a GIS Client Referring now to FIG. 2, a flow diagram of a method 200 for automatically providing travel directions to users of a GIS client is illustrated in accordance with aspects of the present subject matter. The method 200 will generally be discussed herein with reference to the system 100 shown in FIG. 1. Additionally, it should be appreciated that, although the method blocks are shown in FIG. 2 in a specific order, the various blocks of the disclosed method 200 may generally be performed in any suitable order that is consistent with the disclosure provided herein.

The disclosed method 200 will generally be described herein assuming that the user searches within a GIS client for a given geographic location without actively requesting travel directions to such location. For example, as indicated above, users may search for a particular address/entity, view its geographic location on the map or globe displayed via the GIS client and attempt to memorize a particular travel route to the searched location. Unfortunately, such users often forget the travel route and/or become lost when traveling to the searched location. As will be described below, the disclosed method 200 may be utilized to automatically provide a user travel directions when it is determined that user has lost his/her way.

As shown in FIG. 2, at (202), the method 200 may include receiving a search request from a user associated with a geographic location. For example, as indicated above, the user may input a search request for determining the geographic location of a specified address or entity, such as building, restaurant, store, landmark and/or any other suitable entity. In response to such request, the GIS client may cause the geographic location associated with such address or entity to be displayed to the user on the map or globe rendered by the GIS client 154.

Additionally, at (204), the method 200 includes implementing a background software routine in response to the search request. As indicated above, the background software routine may be implemented by the lost detection module 156 in order to determine when it appears that the user has lost his/her way when traveling to the searched geographic location. Thus, the background software routine may generally include any suitable steps, sub-routines and/or processes that allow for the lost detection module 156 to determine when the user has lost his/her way. For instance, as shown in FIG. 2, in several embodiments, the background software routine may be configured, at (206) to monitor the user's movement and, at (208), to determine whether the user's movements are indicative of the user being lost as he/she travels to the searched location. As indicated above, the client device 140 may include a positioning device 160 configured to generate position data associated with the current location of the client device 140 (as well as the change in position or speed of the device 140). Thus, by using the position data provided by the positioning device 160, the background software routine may monitor or track the user's movement and, based on such movements, determine whether the user has lost his/her way without actively providing travel directions and/or any other notifications to the user relating his/her location to the searched location.

In general, the background software routine may be configured to utilize any suitable movement-related factor(s) in order to determine whether the user has lost his/her way. For example, in several embodiments, in response to the search request, the background software routine may be configured to identify one or more reference travel routes for traveling between the user's current location and the searched geographic location. In such embodiments, the reference travel route(s) may be stored or cached in the device's memory and subsequently used for analyzing an actual travel route taken by the user (e.g., the actual travel route as determined using the position data provided by the positioning device 160). For instance, the actual travel route may be compared to the reference travel route(s) to determine if and when the user makes any off-route turns. If the number of off-route turns included within the user's actual travel route exceeds a predetermined off-route turn threshold (e.g., two or more off-route turns or three or more off-route turns or four or more off-route turns), it may be determined that the user has lost his/her way when traveling to the searched geographic location.

As used herein, the term "off-route turn" corresponds to a user movement that results in the user traveling down a portion of a road or street that is not included within the route(s) associated with the reference travel route(s). For example, if the reference travel route(s) contains a travel path that requires a left turn at a given road intersection, the user's actual travel route would include an off-route turn if the user turned right at the intersection or went straight through the intersection.

In addition to the comparing the actual travel route taken by the user to the identified reference travel route(s), or as an alternative thereto, the background software routine may be configured to identify a lost travel pattern(s) associated with the user's movement, particularly when the user is located within a predetermined distanced threshold from searched geographic location. As used herein, the term "lost travel pattern" refers to any pattern of movement by the user that is generally indicative of the user being lost or unaware of how to proceed to the searched geographic location. For example, when people know that they are in close proximity to a desired travel destination but are not quite sure of the exact location of the destination, they tend to exhibit certain travel patterns, such as by driving in a circle(s) around a given area or by backtracking along previously traveled roads. In these instances, the background software routine may be configured to identify such travel pattern(s) in order to determine that the user has lost his/her way.

The background software routine may identify the lost travel pattern(s) using any suitable pattern or cycle detection methodology. For example, in one embodiment, the background software routine may utilize a suitable graph algorithm in order to map or graph the user's movement. In such an embodiment, if the map/graph indicates that the user has traveled according to a lost travel pattern (e.g., the graph indicates that the user has driven in a circle), it may be assumed that the user has lost his/her way.

Additionally, in embodiments in which the background software routine is configured to monitor the user's travel patterns when he/she is located within a predetermined distanced threshold from the searched geographic location, the threshold may generally correspond to any suitable distance. For example, in a particular embodiment, the distance threshold may correspond to a distance that is less than 10 miles from the searched geographic location, such as less than 5 miles or less than 2 miles.

Moreover, in addition to the comparing the actual travel route taken by the user to the identified reference travel route(s) and/or identifying lost travel patterns, or as an alternative thereto, the background software routine may be configured to monitor the travel speed at which the user is moving in order to detect when the user has lost his/her way. For instance, people tend to slow down when they are lost or unsure of where they are going as they look around in order to identify street names, signs, familiar landmarks and/or any other objects that may provide an indication of their current location and/or their location relative to the searched geographic location. Thus, in several embodiments, the background software routine may be configured to identify when the user's travel speed has dropped below a given speed threshold. In such embodiments, the speed threshold may vary, for example, based any number of factors, such as the local speed limit, traffic congestion, road intersections (e.g., intersections containing red lights or stop signs) and/or any other factors that may impact the travel speed of the user. However, in one embodiment, the speed threshold may correspond to a vehicle speed that is less than a percentage of the local speed limit, such as a speed that is equal to less than 95% of the local speed limit or less than 90% of the local speed limit or less than 80% of the local speed limit.

Referring still to FIG. 2, when the back background software routine determines that the user's movements are indicative of the user being lost, the method 200 may include, at (210), automatically implementing a navigation software routine. As indicated above, the navigation software routine may be implemented by the navigation module 158 in order to actively provide travel direction to the user. For example, as shown in FIG. 2, in several embodiments, the navigation software routine may be configured, at (212), to actively provide the user turn-by-turn directions from his/her current location to the searched geographic location when the back background software routine determines that the user's movements are indicative of the user being lost. In doing so, the navigation software routine may provide the travel directions immediately upon initiation of the routine without user prompts or, alternatively, only after the user has provided an input indicating that he/she desires to receive the travel directions.

Figure 3:
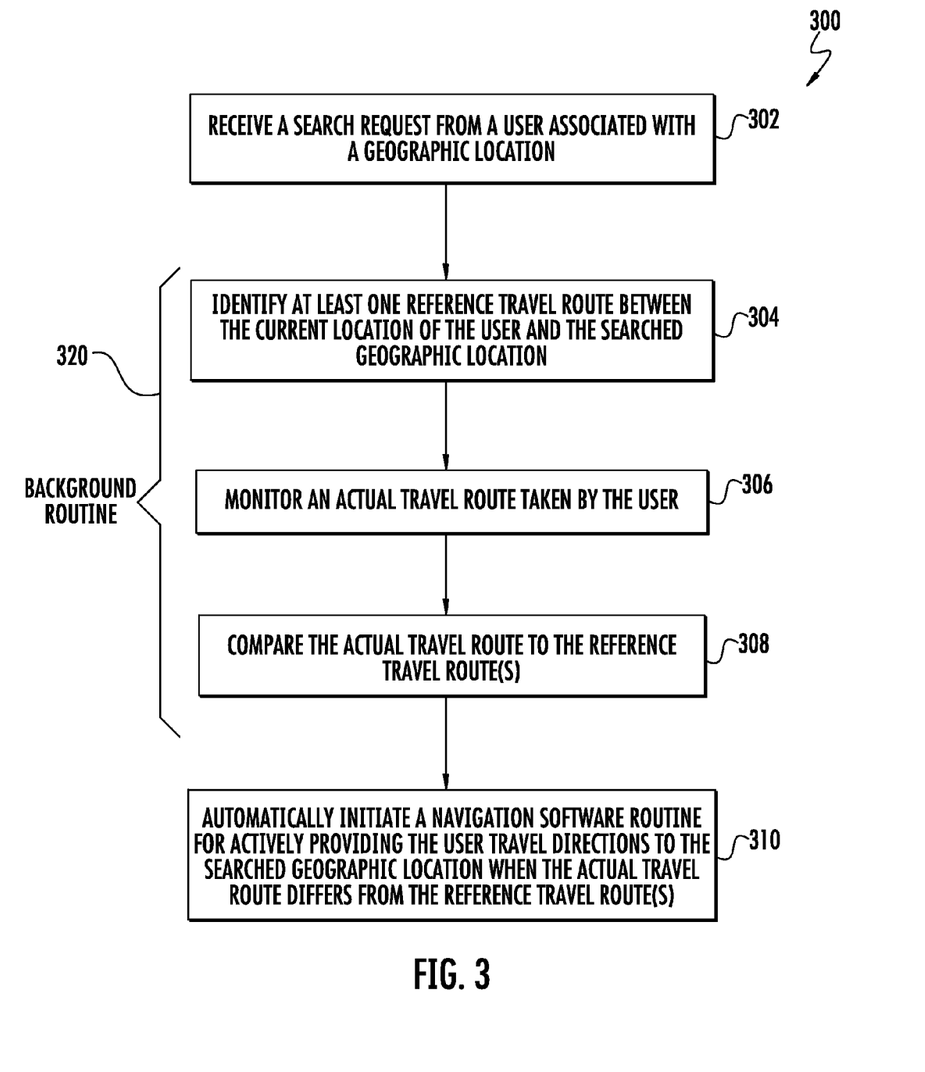
FIG. 3 illustrates a flow diagram of a particular embodiment of a method for automatically providing travel directions to a user of a GIS client in accordance with aspects of the present subject matter.

Referring now to FIG. 3, a flow diagram of a particular embodiment of a method 300 for automatically providing travel directions to users of a GIS client is illustrated in accordance with aspects of the present subject matter. Similar to the method 200 described above with reference to FIG. 2, the method 300 will generally be discussed herein with reference to the system 100 shown in FIG. 1. Additionally, it should be appreciated that, although the method blocks are shown in FIG. 3 in a specific order, the various blocks of the disclosed method 300 may generally be performed in any suitable order that is consistent with the disclosure provided herein.

As shown in FIG. 3, at (302) the method 300 includes receiving a search request from a user associated with a geographic location. For example, as indicated above, the user may input a search request for determining the geographic location of a specified address or entity, such as building, restaurant, store, landmark and/or any other suitable entity.

In addition, at (304), the method 300 includes identifying at least one reference travel route between the current location of the user and the geographic location. Specifically, as indicated above, the client device 140 may be configured to communicate with a suitable server (e.g., server 110) in order to determine one or more suitable travel routes to the searched geographic location or the client device 140 may be configured to locally determine one or more suitable travel routes. Regardless, upon identifying the reference travel route(s), at (306) and (308), the method 300 may include monitoring an actual travel route taken by the user and comparing the actual travel route to the reference travel route(s). As a result of such a comparison, it may be determined when the user has lost his/her way when traveling to the searched location.

As indicated above, the method blocks 304-308 may be configured to be implemented using a background software routine (e.g., as indicated by bracket 320 in FIG. 3), such as the background routine implemented by the lost detection module 156. As such, the method blocks 304-308 may be performed without actively providing travel directions to the user as he/she travels.

Moreover, at (310), the method 300 includes automatically initiating a navigation software routine for actively providing the user travel directions to the geographic location when the actual travel route differs from the reference travel route(s). For example, as indicated above, it may be determined that the actual travel route differs from the reference travel route(s) when the number off-route turns included within the actual travel route exceeds a given off-route turn threshold.

The above disclosed methods 200, 300 have generally been described as being implemented entirely on a client device. However, in other embodiments, the methods may be implemented entirely on the server side or across both the client and server sides.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for automatically providing travel directions to users of a geographic information system client, the method comprising:
    receiving, by one or more computing devices, a search request associated with a geographic location from a user;
    identifying, by the one or more computing devices, at least one reference travel route between a current location of the user and the geographic location;
    monitoring, by the one or more computing devices, an actual travel route taken by the user without actively providing travel directions to the user as the user travels along the actual travel route;
    comparing, by the one or more computing devices, the actual travel route to the at least one reference travel route using a background software routine implemented by the one or more computing devices;
    automatically initiating, by the one or more computing devices, a navigation software routine when the actual travel route differs from the at least one reference travel route; and
    actively providing the user, via the navigation software routine initiated by the one or more computing devices, travel directions to the geographic location.

2. The computer-implemented method of claim 1, wherein identifying at least one reference travel route comprises identifying the at least one reference travel route without receiving a navigation request from the user requesting travel directions to the geographic location.

3. The computer-implemented method of claim 1, wherein monitoring an actual travel route taken by the user comprises monitoring the actual route taken by the user using the background software routine.

4. The computer-implemented method of claim 1, wherein the actual travel route differs from the at least one reference travel route when a number of off-route turns included within the actual travel route exceeds a predetermined off-route turn threshold.

5. The computer implemented method of claim 1, further comprising detecting a lost travel pattern within the actual travel route taken by the user when the user is within a predetermined distance from the geographic location.

6. The computer-implemented method of claim 1, further comprising identifying when a travel speed of the user falls below a predetermined speed threshold.

7. The computer implemented method of claim 1, wherein the at least one reference travel route is cached within memory of the one or more computing devices and is accessed during implementation of the background software routine.

8. The computer-implemented method of claim 1, wherein the one or more computing devices comprises a client device of the user.

9. A system for automatically providing travel directions to users of a geographic information system client, the system comprising:
    one or more computing devices including one or more processors and associated memory, the memory storing instructions that, when executed by the one or more processors, configure the one or more computing devices to:
        receive a search request associated with a geographic location from a user;
        in response to the search request, implement a background software routine, the background software routine configured to:
            monitor movements of the user without actively providing travel directions to the user; and
            determine whether the user's movements are indicative of the user being lost based on at least one movement-related factor as the user travels to the geographic location;
        automatically initiate a navigation software routine when the background software routine determines that the user's movements are indicative of the user being lost; and
        actively provide the user, via the navigation software routine initiated by the one or more computing devices, travel directions to the geographic location.

10. The system of claim 9, wherein the at least one movement-related factor comprises an actual travel route taken by the user as compared to at least one reference travel route between a current location of the user and the geographic location, the background software routine being further configured to:
- monitor the actual travel route taken by the user;
- compare the actual travel route to the at least one reference travel route; and
- automatically initiate the navigation software routine when the actual travel route differs from the at least one reference travel route.

11. The system of claim 10, wherein the background software routine is further configured to identify the at least one reference travel route without receiving a navigation request from the user requesting travel directions to the geographic location.

12. The system of claim 10, wherein the actual travel route taken by the user is monitored without providing the user any notifications relating the user's location to the at least one reference travel route.

13. The system of claim 10, wherein the actual travel route differs from the at least one reference travel route when a number of off-route turns included within the actual travel route exceeds a predetermined off-route turn threshold.

14. The system of claim 9, wherein the at least one movement-related factor comprises a lost travel pattern of the user, the background software routine being further configured to detect the lost travel pattern within the user's movement when the user is within a predetermined distance from the geographic location.

15. The system of claim 9, wherein the at least one movement-related factor comprises a travel speed of the user, wherein the background software routine is further configured to identify when the travel speed of the user falls below a predetermined speed threshold.

16. A tangible, non-transitory computer-readable medium storing computer-executable instructions that, when executed by one or more processors, cause the one or more processors to perform operations, comprising:
- receiving a search request associated with a geographic location from a user;
- identifying at least one reference travel route between a current location of the user and the geographic location;
- monitoring an actual travel route taken by the user without actively providing travel directions to the user as the user travels along the actual travel route;
- comparing the actual travel route to the at least one reference travel route using a background software routine implemented by the one or more processors;
- automatically initiating a navigation software routine when the actual travel route differs from the at least one reference travel route; and
- actively providing the user, via the navigation software routine, travel directions to the geographic location.

17. The computer readable medium of claim 16, wherein identifying at least one reference travel route comprises identifying the at least one reference travel route without receiving a navigation request from the user requesting travel directions to the geographic location.

18. The computer readable medium of claim 16, wherein the actual travel route differs from the at least one reference travel route when a number of off-route turns included within the actual travel route exceeds a predetermined off-route turn threshold.

19. The computer readable medium of claim 16, wherein the actual route taken by the user is monitored without providing the user any notifications relating the user's location to the at least one reference travel route.

20. The computer readable medium of claim 16, further comprising at least one of detecting a lost travel pattern within the actual travel route taken by the user when the user is within a predetermined distance from the geographic location or identifying when a travel speed of the user falls below a predetermined speed threshold.

* * * * *